(12) United States Patent
Scott et al.

(10) Patent No.: US 11,003,653 B2
(45) Date of Patent: May 11, 2021

(54) METHOD AND SYSTEM FOR SECURE DIGITAL DOCUMENTATION OF SUBJECTS USING HASH CHAINS

(71) Applicants: Glenn Scott, Los Altos Hills, CA (US); Roger Meike, Mountain View, CA (US); Michael Gabriel, Milpitas, CA (US); Ian Panchevre, Mountain View, CA (US); Amir Eftekhari, San Diego, CA (US); Ian Pentland, Mountain View, CA (US)

(72) Inventors: Glenn Scott, Los Altos Hills, CA (US); Roger Meike, Mountain View, CA (US); Michael Gabriel, Milpitas, CA (US); Ian Panchevre, Mountain View, CA (US); Amir Eftekhari, San Diego, CA (US); Ian Pentland, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 495 days.

(21) Appl. No.: 15/994,866

(22) Filed: May 31, 2018

(65) Prior Publication Data

US 2019/0370366 A1    Dec. 5, 2019

(51) Int. Cl.
*G06F 16/23*    (2019.01)
*H04L 9/06*     (2006.01)
*G06F 16/18*    (2019.01)

(52) U.S. Cl.
CPC ........ *G06F 16/235* (2019.01); *G06F 16/1805* (2019.01); *H04L 9/0637* (2013.01); *H04L 2209/38* (2013.01)

(58) Field of Classification Search
CPC . G06F 16/235; G06F 16/1805; H04L 9/0637; H04L 2209/38
See application file for complete search history.

(56) References Cited

U.S. PATENT DOCUMENTS

| | | | | |
|---|---|---|---|---|
| 2009/0328218 A1* | 12/2009 | Tsurukawa | ............ | H04L 9/3247 726/23 |
| 2014/0259123 A1* | 9/2014 | Haynes | ............... | G06F 21/6218 726/4 |
| 2015/0332283 A1* | 11/2015 | Witchey | ................ | H04W 12/02 705/3 |

(Continued)

OTHER PUBLICATIONS

Zhao et al., Lightweight Backup and Efficient Recovery Scheme for Health Blockchain Keys, Mar. 2017, IEEE 13th International Symposium on Autonomous Decentralized System, pp. 229-234 (Year: 2017).*

*Primary Examiner* — Kenneth W Chang
(74) *Attorney, Agent, or Firm* — Ferguson Braswell Fraser Kubasta PC

(57) ABSTRACT

The invention relates to a method for documenting subjects using hash chains. The method includes receiving a subject data write request including one or more subject attribute values, generating a fingerprint from a current last block of a hash chain, and generating a payload from the subject data, the payload including the one or more subject attribute values and one or more keys identifying the one or more subject attribute values. The method further includes appending a block to the hash chain. The appended block includes the payload and the fingerprint.

16 Claims, 11 Drawing Sheets

(56) References Cited

U.S. PATENT DOCUMENTS

| | | | |
|---|---|---|---|
| 2016/0191243 A1* | 6/2016 | Manning | H04L 9/321 |
| | | | 713/168 |
| 2016/0344737 A1* | 11/2016 | Anton | G06F 21/6218 |
| 2017/0005804 A1* | 1/2017 | Zinder | H04L 63/123 |
| 2017/0366353 A1* | 12/2017 | Struttmann | G06F 21/64 |
| 2018/0139186 A1* | 5/2018 | Castagna | H04L 9/3242 |

* cited by examiner

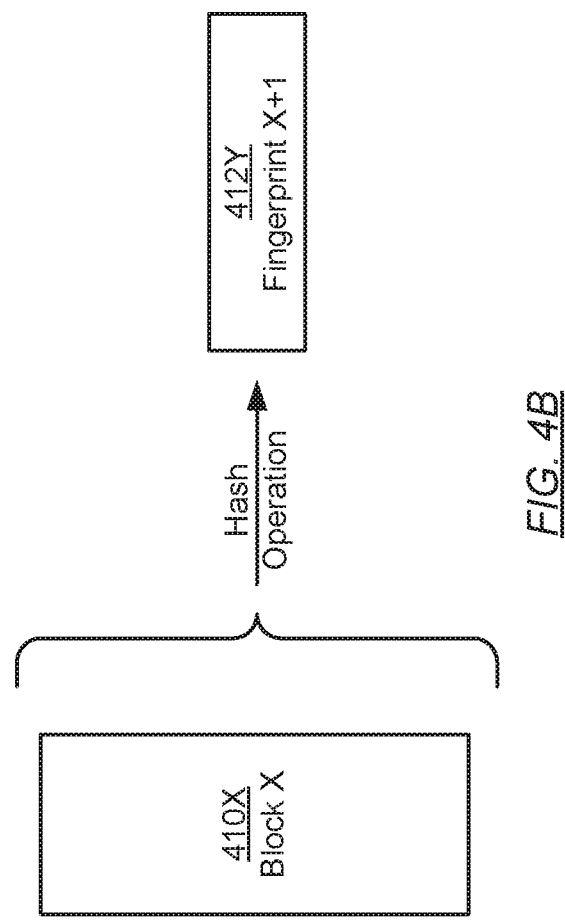

METHOD AND SYSTEM FOR SECURE DIGITAL DOCUMENTATION OF SUBJECTS USING HASH CHAINS

BACKGROUND

Journals and ledgers may be used to record a history of changes over time associated with a subject. A subject documented in this manner may be a property, an inventory, a scientific experiment, a business, a set of accounts, a machine, a process, a human, an ownership, an access control, or any other tangible or non-tangible item or entity that may experience change over time. The established history of changes may enable reconstruction of a state in time, for the subject.

SUMMARY

In general, in one aspect, one or more embodiments relate to a method for documenting a subject, the method comprising: receiving a subject data write request comprising subject data specific to the subject to be documented and a subject ID, wherein the subject data comprise at least one subject attribute value; writing the at least one subject attribute value to an object database; generating at least one pointer to the at least one subject attribute value in the object database; generating a fingerprint from a current last block of a hash chain; generating a payload from (i) the at least one pointer or at least one subject attribute value and (ii) at least one key identifying the at least one subject attribute value, wherein the payload comprises the subject ID; and appending a block to the hash chain, wherein the appended block comprises the payload and the fingerprint.

In general, in one aspect, one or more embodiments relate to a method for documenting financial transactions using hash chains, the method comprising: receiving a financial transaction data write request comprising at least one subject attribute value; generating a fingerprint from a current last block of a hash chain; generating a payload from the financial transaction data, the payload comprising the at least one subject attribute value and at least one key identifying the at least one subject attribute value; and appending a block to the hash chain, wherein the appended block comprises the payload and the fingerprint.

In general, in one aspect, one or more embodiments relate to a system for documenting a subject using hash chains, the system comprising: a hardware processor; a communication interface executing on the hardware processor configured to receive a subject data write request comprising subject data specific to the subject to be documented and a subject ID; an object database configured to receive an entry comprising at least one subject attribute value; a hash chain processing engine configured to: generate at least one pointer to the at least one subject attribute value in the object database; generate a fingerprint from a current last block of a hash chain; generate a payload from (i) the at least one pointer or at least one subject attribute value and (ii) at least one key identifying the at least one subject attribute value, wherein the payload comprises the subject ID; and append a block to the hash chain stored in a hash chain repository, wherein the appended block comprises the payload and the fingerprint.

In general, in one aspect, one or more embodiments relate to a non-transitory computer readable medium including computer readable program code for causing a computer system to: receive a subject data write request comprising subject data specific to the subject to be documented, wherein the subject data comprise at least one subject attribute value; write the at least one subject attribute value to an object database; generate at least one pointer to the at least one subject attribute value in the object database; generate a fingerprint from a current last block of a hash chain; generate a payload from the at least one pointer and at least one key identifying the at least one subject attribute value; and append a block to the hash chain, wherein the appended block comprises the payload and the fingerprint.

Other aspects of the disclosure will be apparent from the following description and the appended claims.

BRIEF DESCRIPTION OF DRAWINGS

FIG. 4B shows the generation of a fingerprint from a block of a hash chain in accordance with one or more embodiments of the disclosure.

DETAILED DESCRIPTION

Figure 1:
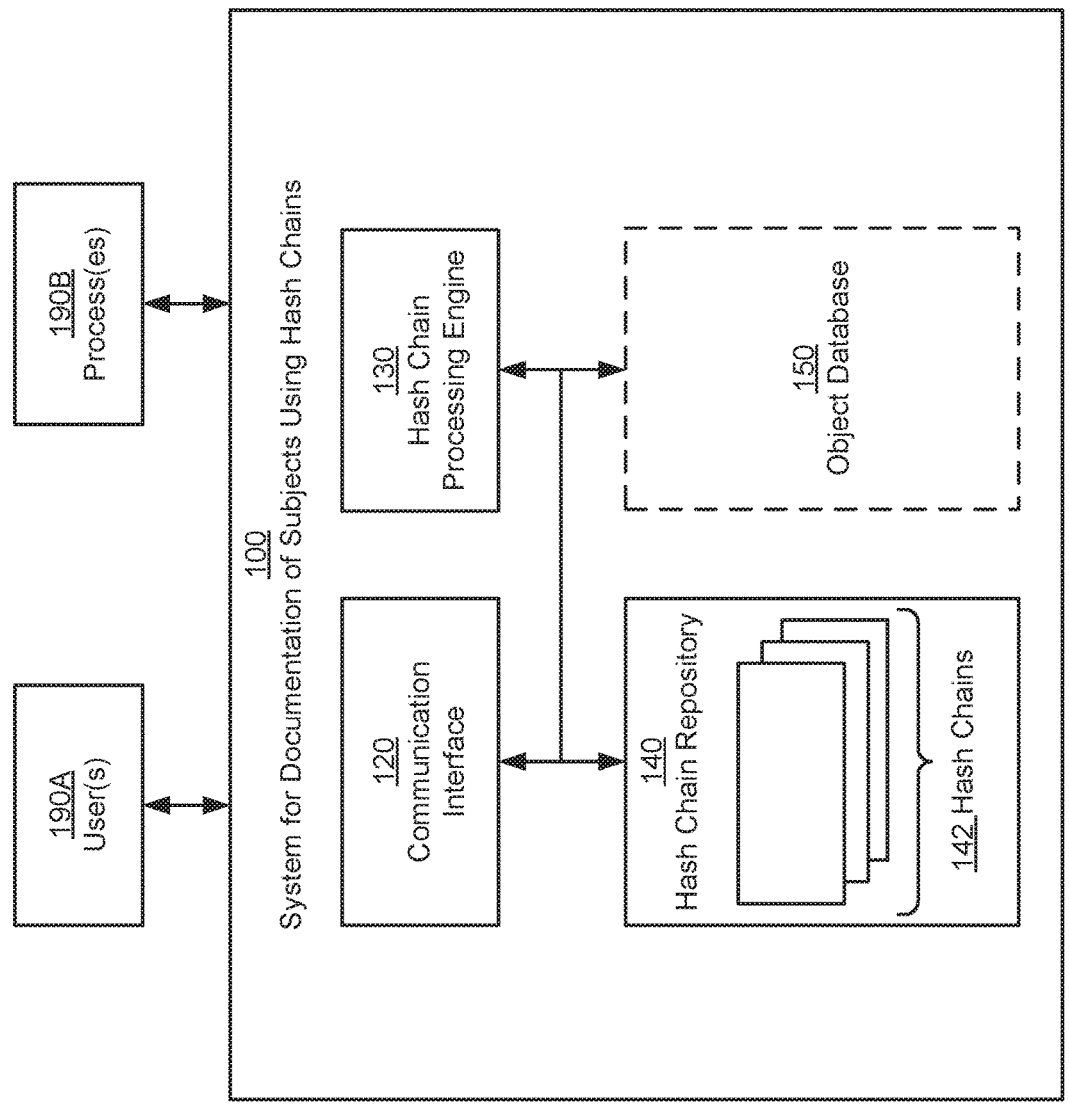
FIG. 1 shows a system for documentation of subjects using hash chains in accordance with one or more embodiments of the disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the disclosure provide methods and systems for secure digital documentation of subjects using hash chains. In one or more embodiments of the disclosure, the documentation may be a secure digital documentation (or provenance (i.e., chronology of the ownership, custody or location)) of a subject afforded by the use of hash chains. In embodiments, the documentation is electronic or digital and may be considered tamper-proof. A subject, in accordance with one or more embodiments of the disclosure, may be a property, an inventory, item of inventory, a scientific experiment, a business, a set of accounts, a transaction between two entities, a machine, a process, a human, an ownership, an access control, or any other tangible or non-tangible entity, item or activity that may experience change over time. Such subjects frequently require documentation in a secure, tamper-proof manner. Frequently a trusted documentation is desirable, for example to make sure that the documentation is in a digital form that is fault tolerant, resistant to attacks or tampering, and transparent.

Consider, for example, documenting activity in the medical field. A common use of secure digital documentation using hash chains would be to ensure security and privacy protection to an electronic medical record. In particular, the digital storage and management of identities or the logging of critical and highly private medical data of patients is essential. In the medial field fault tolerance, resistance to attacks, and transparency are highly relevant. Another example is the domain of accounting. It is desirable to ensure that no malicious party can alter an account history of a business or individual. Similarly, it may be desirable that a locally occurring failure does not make the account history unavailable. Also, it may be desirable to allow a reliable audit of the account history. These and other features now known or developed in the future may be provided by the use of hash chains, as further discussed below.

Finally, consider the example of a government issued identification card (ID). Using embodiments of this disclosure, the provenance of an ID may be determined, as well as the information contained on the ID itself. In this example, the ID is determined to have been issued by a valid governmental authority (e.g., state department of motor vehicles, state regulatory agency). Meanwhile, the date of birth found on the ID of the individual issued the ID (the relevant data in this example) is deemed to have come from a valid issuing authority (e.g. the hospital where the person was born or a birth certificate). Accordingly, the ID is a trusted digital documentation, which is fault tolerant, resistant to attacks or tampering, and transparent.

The subsequently described embodiments of the disclosure are, therefore, applicable to a broad range of domains. Wherever the state of a subject changes over time, a history of these changes may be established, in accordance with one or more embodiments of the disclosure.

Embodiments of the disclosure include methods and systems that enable the documentation of subjects. Embodiments of the disclosure further include methods and systems that enable retrieval of previously stored data associated with a subject. The documentation of a subject may be updated whenever subject data change, e.g., when an event that affects the subject occurs. For example, a changing account balance may be documented when detected, newly entered data may be added to the documentation of the subject, etc. The documentation may include various data depending on the nature of the event. For example, the documentation may include an account balance, a timestamp (date and/or time when a change of the account balance was detected), a cause of the event (e.g., wire transfer received), parties involved (e.g., wire transfer initiated by person X), and any other information considered relevant. In one or more embodiments of the disclosure, a subject is documented using a framework of objects, as further discussed below with reference to FIGS. 2A, 2B, 3A, 3B, 3C and 3D. Each object may document one, multiple or even all known aspects of the subject in a linear, ordered, indelible list of recorded events relevant to the subject. An object may be used to document a subject in a manner specific to a particular concern. Accordingly, data in the object may be selected to be related to a concern (i.e., one or more particular aspects that are of interest to a user), whereas unrelated data, although still associated with the subject, may not necessarily be documented. In financial applications, for example, an object may contain an account history or the history of multiple accounts; in medical applications an object may contain a patient's medical record, etc.

In one or more embodiments of the disclosure, subjects are documented using hash chains. More specifically, objects that describe the subjects are stored in a hash chain. A hash chain may include a series of blocks, and each block may document one or more of the aspects of the subject, thus establishing a cumulative history of the subject, as described in detail below. In one or more embodiments of the disclosure, each block further includes a fingerprint of the previous block in the hash chain. This fingerprint uniquely identifies the previous block and, thus, enforces an order of the blocks in the hash chain. The hash chains used for documenting subjects may be stored in the form of a public ledger, or they may be kept confidential. A hash chain may, in addition, be based on a distributed consensus approach, analogous to a blockchain. Once a block is added to the hash chain, this block, in accordance with an embodiment of the disclosure, is persistent, i.e., the block cannot be modified. Due to the storage being in a distributed manner, it may be difficult or even impossible to alter or falsify transactions stored in the hash chain. Because the hash chain, in accordance with an embodiment of the disclosure, is publicly stored, the authenticity of the blocks in the hash chain may be verified for authenticity by the public, i.e., the hash chain is auditable. In embodiments that store hash chains in a non-public manner, the audit may be performed by authorized users only. A detailed description of hash chains is provided below with reference to FIGS. 4A and 4B.

Turning to FIG. 1, a system for documentation of subjects using hash chains, in accordance with one or more embodiments of the disclosure, is shown. The system (100) may include a communication interface (120), a hash chain processing engine (130) and a hash chain repository (140). Some embodiments may further include an object database (150). Each of these components is described below. The system (100) may be accessed by users (190A) and/or by processes (190B), as subsequently discussed.

The communication interface (120), in accordance with one or more embodiments of the disclosure, enables users (190A) and processes (190B) to access components of the system (100). The communication interface (120) may include a user interface that enables a user (190A), for example, to enter a subject, an action related to a subject, or to retrieve subject information. The communication interface (120) may provide the entered subject information to the hash chain processing engine (130) which may process the information as described below. Similarly, the communication interface (120) may submit a request for a retrieval of data related to a subject to the hash chain processing engine (130). Additionally or alternatively, a process (190B) may submit or request data. Such a process may be, for example, an external accounting system, a data acquisition system, or any other component configured to provide or obtain information associated with a subject to be documented.

The hash chain processing engine (130), in accordance with one or more embodiments of the disclosure, includes a set of machine-readable instructions (stored on a computer-readable medium) which, when executed by the system (100) document a subject, as previously defined, based on input provided by the communication interface (120). Further, the hash chain processing engine (130), in accordance with an embodiment of the disclosure, is also configured to retrieve data regarding the documented subject. A detailed description of the operations performed by the hash chain processing engine (130) is provided in the flowcharts of FIGS. 5, 6, 7 and 8.

The hash chain repository (140), in accordance with one or more embodiments of the disclosure, stores hash chains (142). Each hash chain may document one or more subjects. A detailed description of the structure of hash chains is provided below with reference to FIGS. 4A and 4B. The database used for the hash chain repository may be implemented using any format suitable for the storage of hash chains. The hash chain repository (140) may be stored in non-volatile or volatile memory, e.g. on a hard disk drive or in RAM.

In one or more embodiments of the disclosure, the hash chain repository is distributed and includes multiple copies of the same hash chains. While these copies may be synchronized, they may be separately maintained, thereby establishing a distributed consensus system in which a bad actor would have to simultaneously alter the majority of the copies to make an unauthorized change to an earlier block of the hash chain. This distributed implementation may make it nearly impossible to make an unauthorized modification to a previously written block of a hash chain. The consensus algorithm that is used to ensure that the next block in a blockchain, or more generally in a hash chain, is the one and only version of the truth, and to keep adversaries from derailing the system and successfully forking the chain, may be, for example a proof of work algorithm, as used in the Bitcoin blockchain environment. Alternatives to proof of work algorithms include, but are not limited to, proof of stake, proof of activity, proof of burn, proof of capacity and proof of elapsed time algorithms, or other algorithms capable of <insert germane functionality here> now known or later developed.

The object database (150) in one or more embodiments of the disclosure stores object content used to document subjects. While in some embodiments, the documentation of subjects is maintained in the hash chains (124), in other embodiments, the hash chains include references to the object database (150), where the documentation of the subjects is stored.

The database used for the object database may be implemented using any format suitable for the storage of data such as numbers and/or alphanumeric content. The object database (150) may be stored in non-volatile or volatile memory, e.g., on a hard disk drive or in RAM. The database may be central or distributed.

Figure 9A:
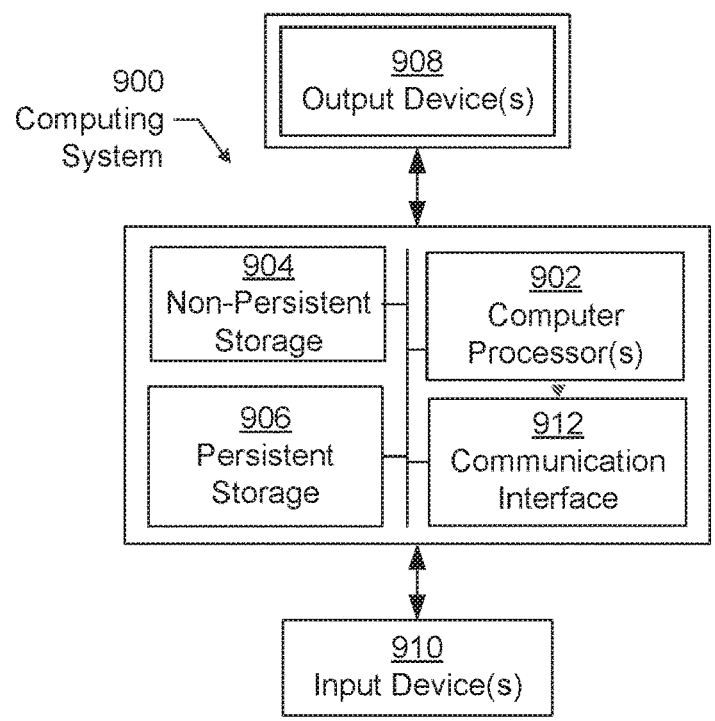
FIGS. 9A and 9B show computing systems in accordance with one or more embodiments of the disclosure.
Figure 9B:
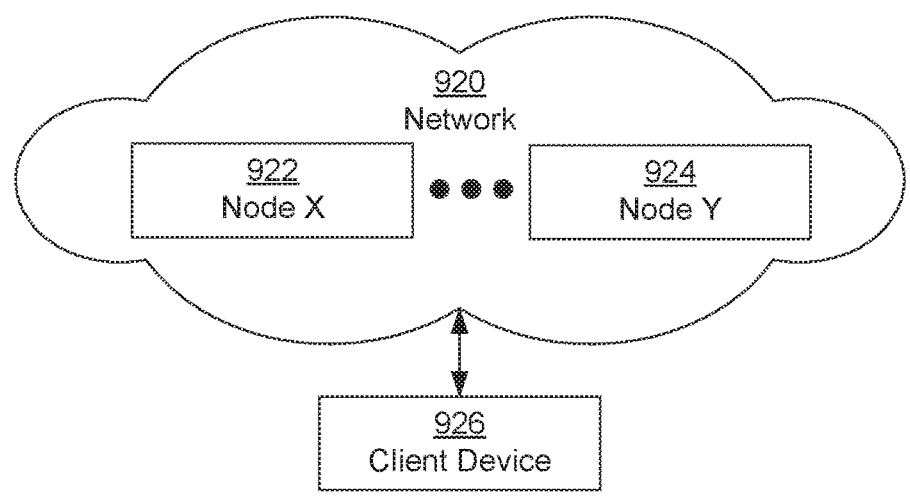

Embodiments of the disclosure may be implemented on one or more computing systems that may be similar to the computing system introduced in FIGS. 9A and 9B.

While FIG. 1 shows a configuration of components, other configurations may be used without departing from the scope of the disclosure. For example, various components may be combined to create a single component. As another example, the functionality performed by a single component may be performed by two or more components that may be communicatively connected using a network connection.

Figure 2A:
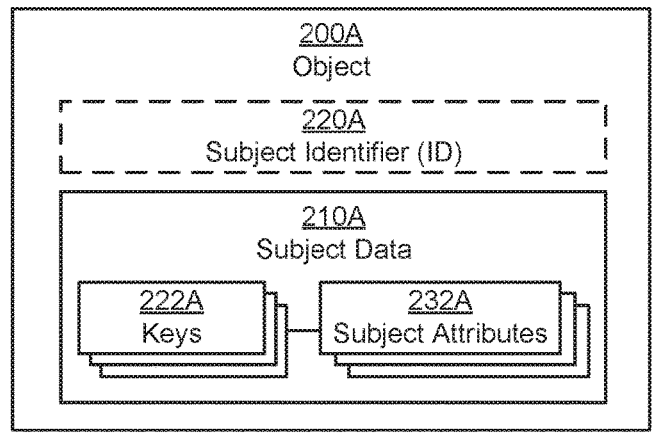
FIG. 2A shows an object in accordance with one or more embodiments of the disclosure.
Figure 2B:
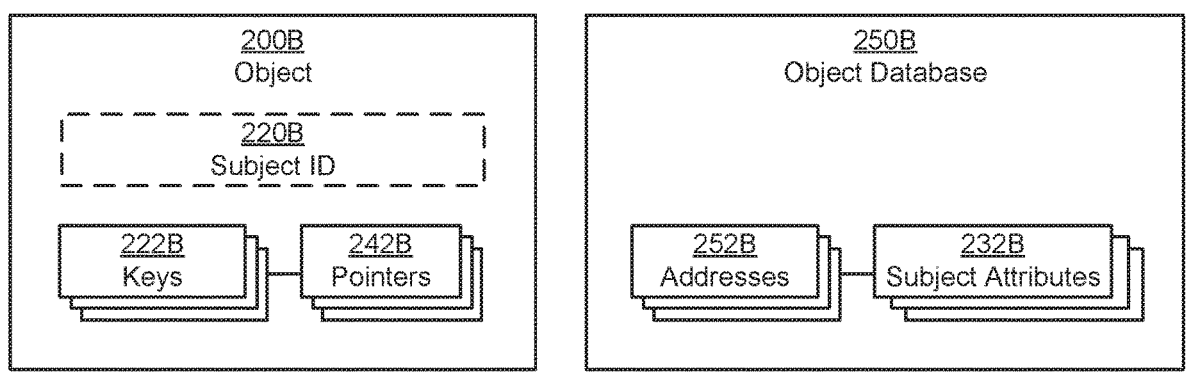
FIG. 2B shows an object and an object database in accordance with one or more embodiments of the disclosure.

FIGS. 2A and 2B show generic objects, used for documenting subjects, in accordance with one or more embodiments of the disclosure. Specific examples of objects are further provided below, with reference to FIGS. 3A-3D.

Turning to FIG. 2A, an object (200A), in accordance with one or more embodiments of the disclosure is shown. The object (200A) may be used to document a subject as subsequently discussed. The object (200A) may include subject data (210A) and a subject identifier (220A). Each of these components is subsequently described.

The subject data (210A) may include a set of keys (222A) and a corresponding set of subject attributes (232A). A key may serve as an identifier for a subject attribute, whereas the subject attribute may contain one or more subject attribute values, describing the subject. A key may be any type of alphanumeric identifier that enables unambiguous identification of the associated subject attribute. As further illustrated in FIGS. 3A-3D, a subject attribute may be any characteristic or change of a characteristic of the subject being documented.

Additional data may be associated with a subject attribute value. For example, a timestamp may document when the subject attribute value was established, and/or a user or process ID may document the party responsible for the subject attribute value. Other information considered related to the subject attribute value may be stored along with the subject attribute value, without departing from the disclosure. Subject attribute values may be of different types. A subject attribute value may be a constant, i.e., a fixed numerical or string content, or combinations of numbers and strings. A subject attribute value may further be a variable which may store numbers, strings or combinations thereof. Unlike a constant, a variable may be updated over time. A subject attribute value may further be an adjustment or delta, i.e., an adjustment that may be applied to a previously established subject attribute value to alter that subject attribute values. An adjustment may be an increment, a decrement and/or any other manipulation including mathematical functions. Examples for these types of values are subsequently provided with reference to FIGS. 3A-3D.

Some or all of the subject data (210A) may be stored as a payload in a hash chain, as further described with reference to FIG. 4A. The object (200A) optionally includes a subject identifier (220A). The subject identifier may be any type of unique alphanumeric identifier that may be used to identify the subject. A subject identifier may be necessary if subject data associated with multiple different subjects are stored in a hash chain. A subject identifier may not be necessary if object data associated with only a single subject are stored in a hash chain.

Turning to FIG. 2B, an object (200B) and an object database (250B), in accordance with one or more embodiments of the disclosure, are shown. Unlike the object shown in FIG. 2A, the object in FIG. 2B does not include subject data. Instead, the object includes pointers (242B) that identify locations in an object database (250B) where the subject data documenting the subject are stored, in accordance with an embodiment of the disclosure. More specifically, the pointers (242B) identify addresses (252B) where subject attributes (232B) are stored as subject attribute values. Each of the pointers (242B) is associated with a key (222B). While not shown, a pointer (242B) may further include or may be associated with mechanisms to validate the integrity of the subject data stored under the corresponding address (252B). Such a mechanism may be, for example, a hash value obtained from the associated subject attribute (232B). Further, analogous to the object (200A) of FIG. 2A, the object (200B) may or may not include a subject ID (220B), depending on whether subject data associated with single or multiple subjects are addressed using a single hash chain.

Figure 3A:
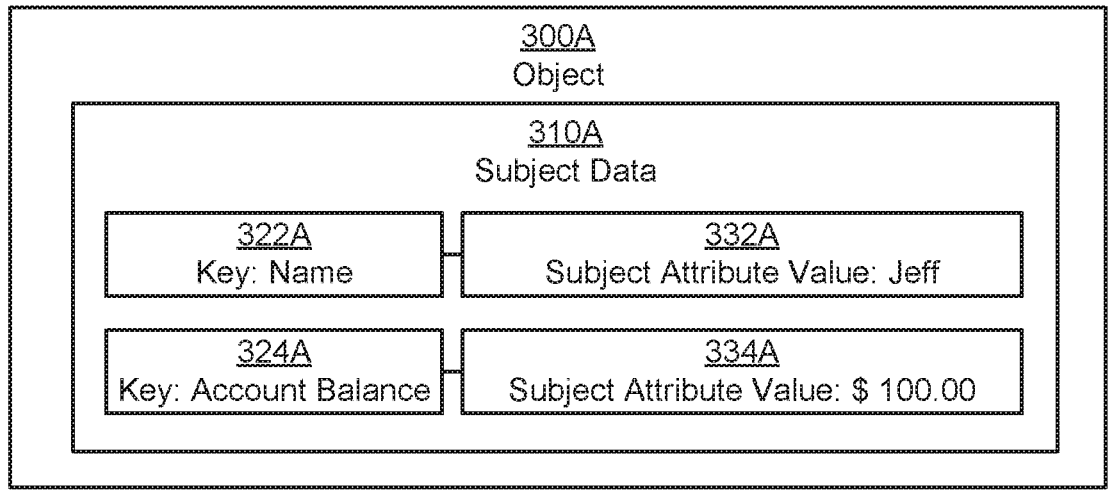
FIGS. 3A and 3B show exemplary objects in accordance with one or more embodiments of the disclosure.
Figure 3B:
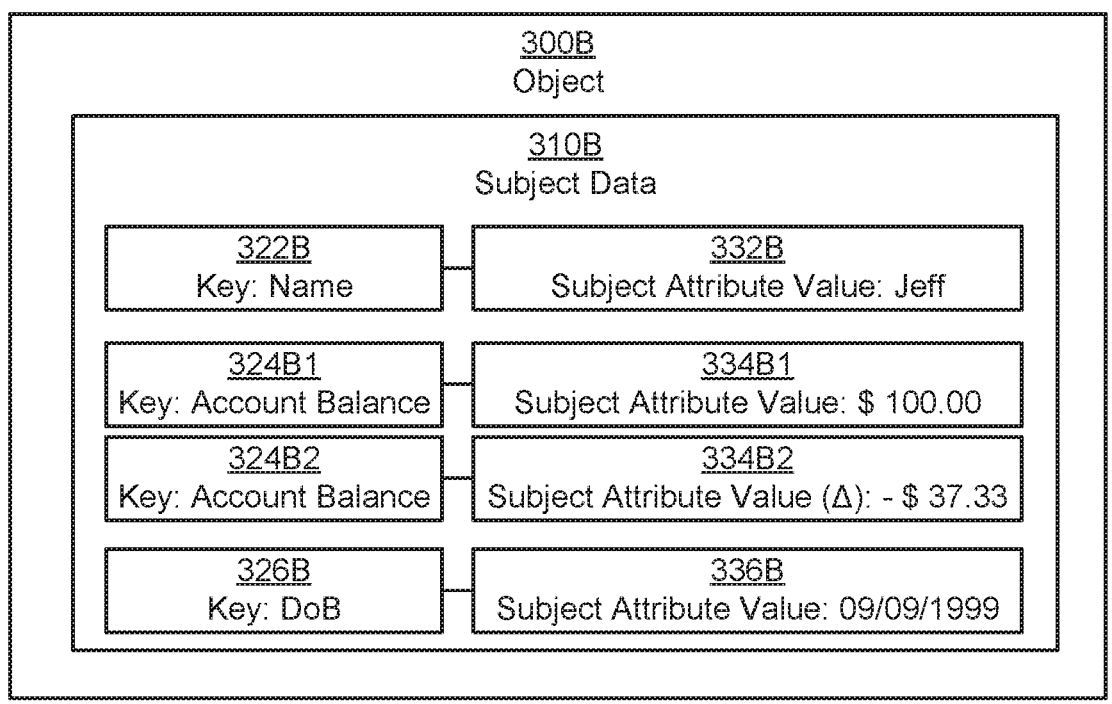

FIGS. 3A and 3B show an exemplary object associated with a subject to be documented, in accordance with one or more embodiments of the disclosure. The exemplary object is directed to a financial application in which the subject is an account. Accordingly, the documented subject attributes are directed to elements such as the account holder name, the account balance, etc. The object (300A) was obtained at a point in time before the object (300B), and content has been added to the object in the meantime. An object, in accordance with an embodiment of the disclosure, thus, enables documentation of not only the current state of a process, but also prior states, thereby establishing a subject history. In FIG. 3A, the subject data (310A) includes the key (322A), a subject attribute including the subject attribute value (332A), the key (324A) and a subject attribute including the subject attribute value (334A). The key (322A) is "name" and the subject attribute value (332A) is "Jeff". Accordingly, the subject data (210A) include a name that is "Jeff", thereby documenting the accountholder's name. Further, an account balance "$100" is stored as a subject attribute value (334A). The key "Account Balance" (324A) is used to label the subject attribute value (334A). In the example, the object (300A) may have been obtained shortly after a bank account was created, and the object therefore does not yet include other data.

In FIG. 3B, the object of FIG. 3A is shown at a later time, after additional data were provided. The subject data (310B) now also include an entry for a date of birth (key (326B) and subject attribute value (336B)). Further, an additional account balance entry (key (324B2) and subject attribute value (334B2)) is now also included. The additional account balance entry is stored as a delta value, i.e., as an adjustment or increment applied to the original account balance.

Assume that the subject data (310A) shown in FIG. 3A is stored in a hash chain by including the subject data (310A) in a block of the hash chain as a payload. To store the additional subject data resulting in the updated object shown in FIG. 3B (keys (324B2, 326B) and subject attribute values (334B2, 336B)), another block may be appended to the hash chain. Each time new subject data become available, a new block may be appended to the existing hash chain. This appended block may include the additional information that became available (i.e., keys (324B2, 326B) and subject attribute values (334B2, 336B)). For example, the appended block may include the account balance increment "−$37.33" (334B2), and the date of birth "09/09/1999" (336B2), along with their keys (324B2, 326B). Later, subject data may be retrieved from the hash chain by reading from the blocks of the hash chain. A discussion of the storage of subject data in blocks of hash chains is provided below with reference to FIG. 4A.

Figure 3C:
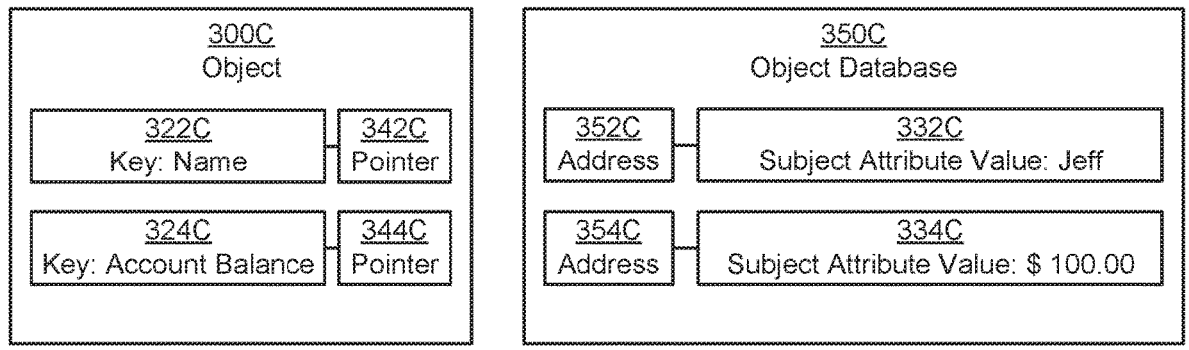
FIGS. 3C and 3D show exemplary objects and object databases in accordance with one or more embodiments of the disclosure.
Figure 3D:
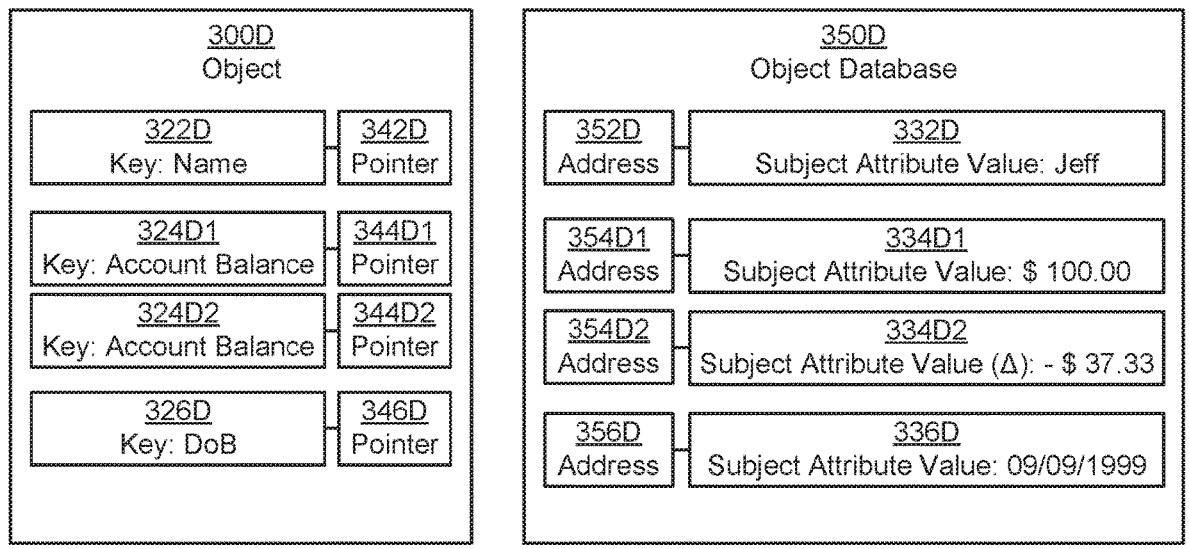

Turning to FIGS. 3C and 3D, exemplary objects and object databases, in accordance with one or more embodiments of the disclosure, are shown. Unlike the objects shown in FIGS. 3A and 3B, the object in FIGS. 3C and 3D do not include subject data. Instead, the objects include pointers (342C, 344C, 342D, 244D1, 344D2, 346D) that identify locations in object databases (350C, 350D) where the subject data describing the subject are stored, in accordance with an embodiment of the disclosure. Specifically, in FIG. 3C, the pointers (342C, 344C) identify addresses (352C, 354C) where subject attribute values (332C, 334C) are stored. Each of the pointers is associated with a key (322C, 324C). Similarly, in FIG. 3D, the pointers (342D, 344D1, 344D2, 346D) identify addresses (352D, 354D1, 354D2, 356D) where subject attribute values (332D, 334D1, 334D2, 336D) are stored. Each of the pointers is associated with a key (322D, 324D1, 324D2, 326D).

Those skilled in the art will appreciate that while the examples provided in FIGS. 3A, 3B, 3C and 3D are directed to an accounting application, embodiments of the disclosure are applicable to other domains. For example, an object may be a patient's electronic medical record, an object may be a temperature log of a refining furnace, an object may be an inventory of a warehouse, etc.

In one or more embodiments of the disclosure, an object is stored in blocks of a hash chain. While no single block may contain all elements of the object, the entire object may be represented by a combination of blocks, with each of these blocks storing a subset of the previously discussed elements of the object.

Figure 4A:
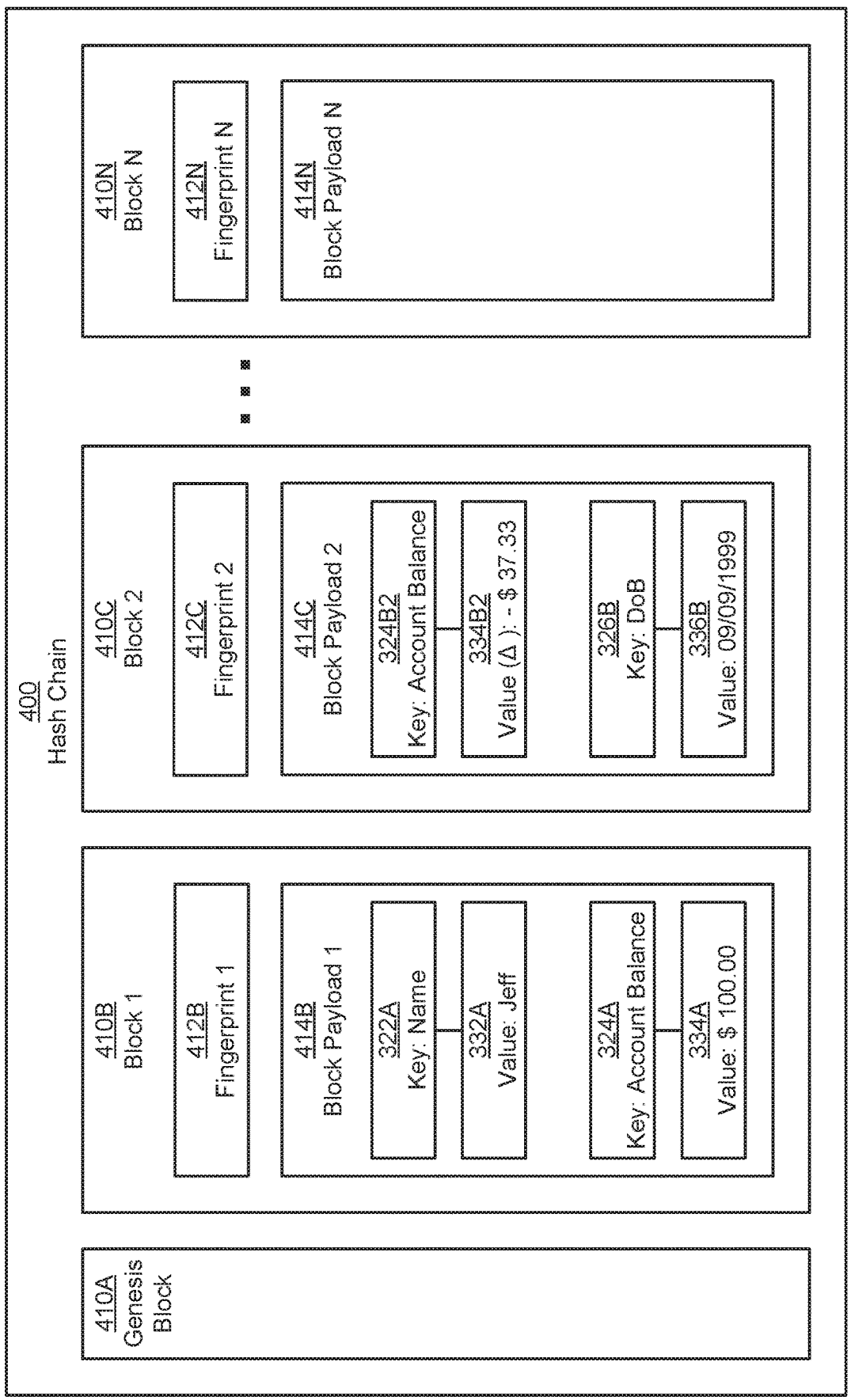
FIG. 4A shows a hash chain in accordance with one or more embodiments of the disclosure.

FIG. 4A shows an exemplary hash chain, in accordance with one or more embodiments of the disclosure. The hash chain (400) includes N blocks (e.g., 410B, 410C, 410N) and may further include a genesis block (410A). Each of the blocks (e.g., 410B, 410C, 410N) may be used to store subject data or pointers as previously discussed with reference to FIGS. 2A, 2B, 3A, 3B, 3C and 3D. The genesis block (410A) may establish the beginning of the hash chain and does not necessarily contain object-related data.

In one or more embodiments of the disclosure, blocks (e.g., 410B, 410C, 410N) include block payloads (e.g., 414B, 414C, 414N). The payload may include subject data or pointers, thereby storing information about a subject or a reference to subject data stored elsewhere. The payload may further include a subject ID, e.g., if the hash chain is used to store data associated with multiple subjects. Consider a scenario in which the hash chain (300) is used to store the objects (300A, 300B), shown in FIGS. 3A and 3B. In the example, the block payload 1 (414B) of block 1 (410B) stores the keys (322A, 324A) and the corresponding values (332A, 334A). Later, as additional data become available, resulting in object (300B) of FIG. 3B, the additionally available subject data are stored in the next block of the hash chain, i.e., in block 2 (410C). Accordingly, block payload 2 (414C) stores the keys (324B2, 326B) and the corresponding values (334B2, 336B). Alternatively, a payload block may store pointers, as previously discussed with reference to FIGS. 3C and 3D.

In one or more embodiments of the disclosure, blocks (e.g., 410B, 410C, 410N) further include fingerprints (e.g., 412B, 412C, 410N). A fingerprint that is stored as part of a particular block, in accordance with an embodiment of the disclosure, is a unique identifier for the block immediately prior to the block that includes the fingerprint. For example, block 2 (310C) includes a fingerprint of block 1 (310B), and block 1 (310B) includes a fingerprint of the genesis block (310A).

FIG. 4B shows the generation of a fingerprint from a block of a hash chain, in accordance with one or more embodiments of the disclosure, using a hash operation. A fingerprint X+1 (412Y) is generated from a block X (410X) using a hash operation, in accordance with an embodiment of the disclosure. Accordingly, a fingerprint is a cryptographic identifier of the previous block. For example, in FIG. 4A, fingerprint 2 (412C) unambiguously identifies block 1 (410B). Embedding the fingerprint in the block enables the organization of blocks in a chain, in which blocks sequentially depend from the respective preceding blocks. A fingerprint may be any combination of characters and/or numbers that is likely to be unique for a block from which it was generated. In one embodiment of the disclosure, a fingerprint is a hash (for example an SHA-1 or SHA-2 hash) of the block that it is associated with. Because a fingerprint of a block is incorporated in the subsequent block, no block in the hash chain may be altered without affecting the most recent block. Specifically, any change of one or more of the blocks (e.g., 410A, 410B, 410C in FIG. 4A) will necessarily result in a different fingerprint N (412N) of block N (410N). Any change anywhere in the hash chain, thus, inevitably results in a fingerprint of the most recent block being altered.

In one or more embodiments of the disclosure, the hash chain is dedicated to documenting a single subject, or it may document multiple subjects. If multiple subjects are documented by a single hash chain, a subject ID may be included when subject data, representing the subject are written to a block of the hash chain. The subject ID enables unambiguous identification of the subject for which subject data are written to the block. In one or more embodiments of the disclosure, multiple copies of the same hash chain may coexist. For example, each party involved in a subject documented using an object, but also other entities may have a copy of the hash chain. Under normal circumstances, these multiple hash chains are identical, even though the hash chains are separately maintained. Conflicts may arise if different parties add conflicting blocks to the chain. Consider, for example, a scenario, in which a shipment is indicated as having been received, based on the carrier's confirmation. However, the recipient claims that the no shipment has been received. If blocks are separately generated based on these conflicting pieces of information, a conflict is necessarily detected once the separately maintained hash chains are checked for consistency. A conflict resolution may be performed in order to determine the correct block to be added to the hash chain.

Maintaining multiple/many copies of a hash chain, in accordance with an embodiment of the disclosure, makes the hash chain resilient to damage or attacks such as the unauthorized editing of earlier blocks, due to the fingerprints that are propagated from block to subsequent block through the hash chain. Any such change would necessarily result in a detectable change in the most recent block and would thus be detectable. An attacker would thus have to consistently alter the majority or all copies of the hash chain in order to credibly demonstrate that the change is legitimate. Depending on the number of existing copies, and assuming that the majority of participants that hold copies is honest, this may be considered impossible.

FIGS. 5, 6, 7 and 8 show flowcharts in accordance with one or more embodiments of the disclosed technology. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

Figure 5:
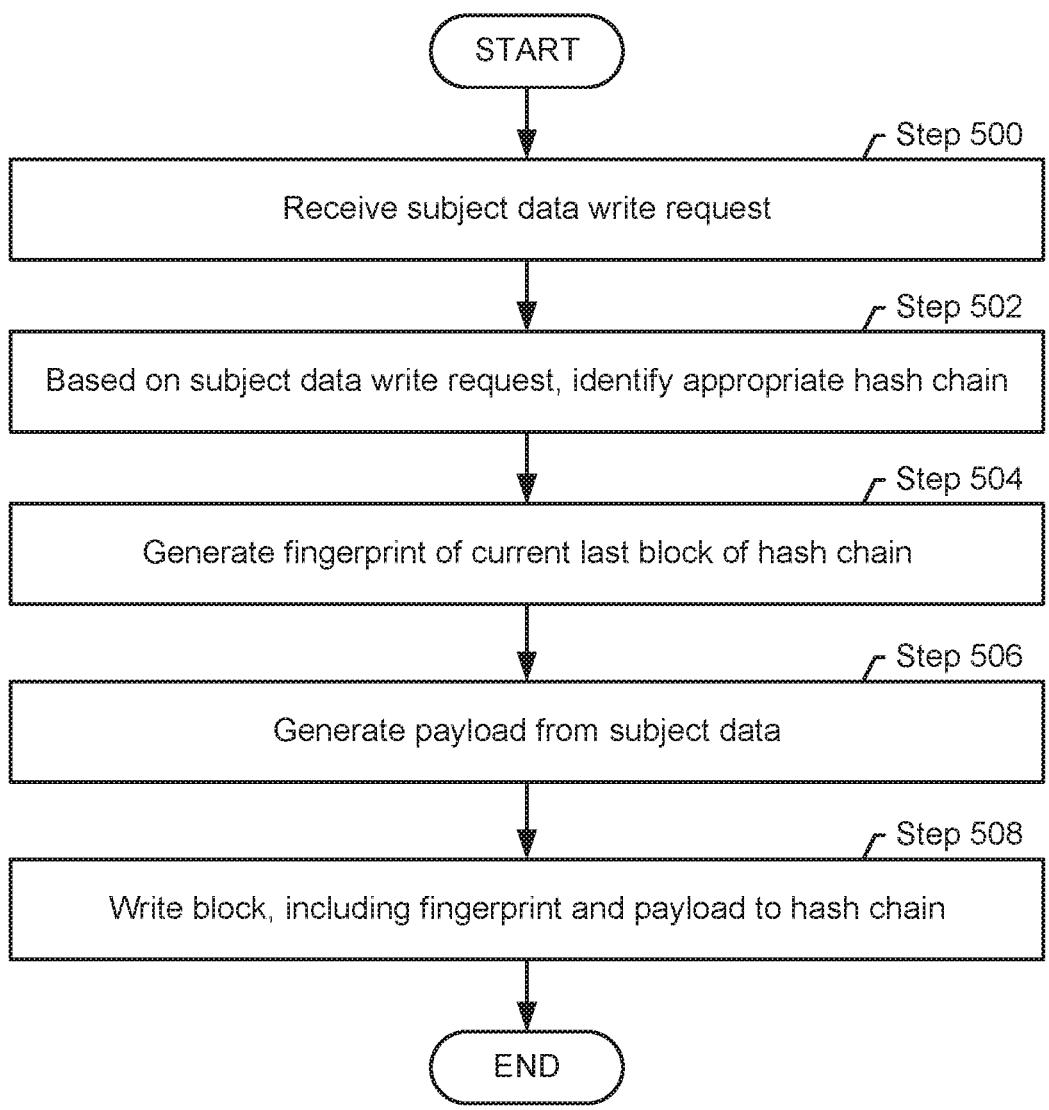
FIGS. 5, 6, 7 and 8 show flowcharts in accordance with one or more embodiments of the disclosure.

FIG. 5 shows a method for writing subject data associated with a subject to a hash chain, in accordance with one or more embodiments of the disclosed technology.

In Step 500, a subject data write request is received. The subject data write request may be received in response to subject data having changed (e.g. subject data stored in an object as subject attribute values being added, removed or edited). The subject data write request may include subject data to be written to a hash chain, and may further include a subject ID. The subject data may be a subset of all subject data associated with the subject. For example, the subject data provided in the subject data write request may only include subject data that has not been previously stored.

In Step 502, based on the subject data write request, the appropriate hash chain for storing the subject data is identified. The appropriate hash chain may be selected from a set of hash chains stored in a hash chain repository. Each of these hash chains may be used to store subject data associated with one or more subjects. Accordingly, the hash chain intended to be used for storing the subject data is selected. The selected hash chain may be a hash chain that already stores subject data associated with the subject and/or subject data associated with other subjects, or a new hash chain to be used for storing the subject data. If a new hash chain is to be used, the new hash chain may be generated. Generation of the hash chain may include generating a genesis block of the hash chain. The genesis block may form the initial block to which blocks that contain subject data may be appended.

In Step 504, a fingerprint of the current last block of the hash chain is generated. The fingerprint may be generated by performing a hash operation, as previously described with reference to FIG. 4B. The current last block may be the genesis block of the hash chain, if the method of FIG. 5 is performed on a hash chain for the first time. Otherwise, the current last block may be a block that was generated during a previous execution of the method of FIG. 5.

In Step 506, the payload to be included in the block that is being added to the hash chain is generated. The payload, in accordance with one or more embodiments of the disclosure, is generated from the subject data that is provided with the subject data write request. The subject data may be provided in a format comprising pairs of keys and subject attribute values, as previously described with reference to FIGS. 2A, 3A and 3B. The payload may further include a subject ID. The subject ID may be included if the hash chain is used for the documentation of multiple subjects, thereby enabling distinction of the subjects, based on the subject ID.

In Step 508, a new block is written to the hash chain. The new block is formed by the payload obtained in Step 506 and the fingerprint obtained in Step 504. The newly appended block establishes the new end of the hash chain, where an additional block may be appended at a later time. Due to the embedded fingerprint of the previous block, the order of blocks, added by repeated execution of the method of FIG. 5, is unambiguously established.

Figure 6:
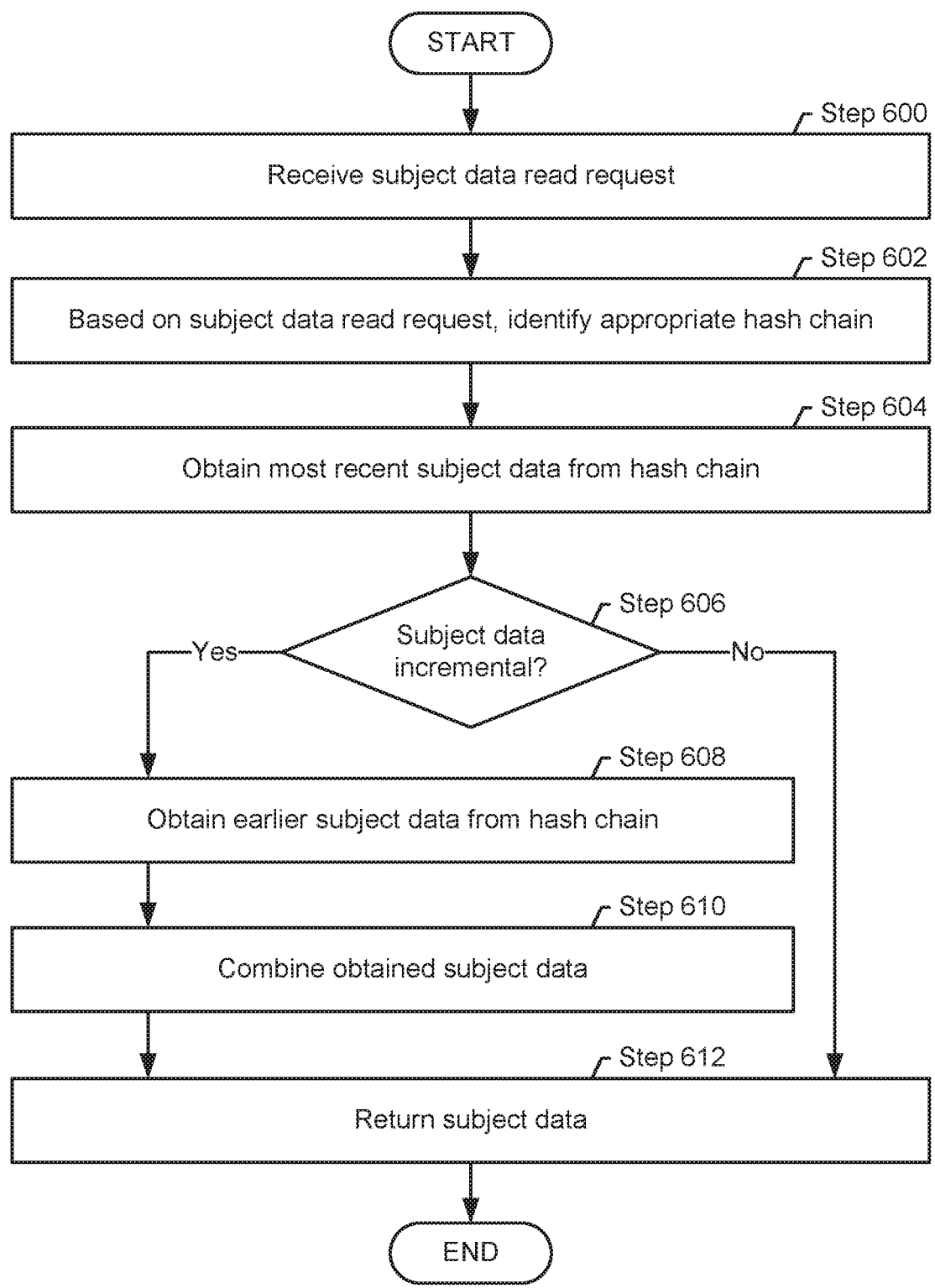

Turning to FIG. 6, a method for retrieving subject data from a hash chain, in accordance with one or more embodiments of the disclosure, is shown. The method may be used to retrieve subject data that were previously written to the hash chain, as described with reference to FIG. 5.

In Step 600, a subject data read request is received. The subject data read request may include a key used to identify a subject attribute value to be read. The object may further include a subject ID used to identify the subject for which subject data is to be obtained.

In Step 602, based on the subject data read request, the appropriate hash chain in which the subject data are stored is identified. The appropriate hash chain may be selected from the set of hash chains stored in a hash chain repository. The appropriate hash chain may be identified based on the subject ID In Step 604, the most recent subject data associated with the key provided with the data read request are obtained. Identification of the subject data in the hash chain may further be based on the subject ID, e.g., if subject data for multiple subjects are stored in the hash chain. The most recent subject data associated with the key may be obtained by searching the hash chain starting from the most recently added block, in a backward direction. Consider, for example, the exemplary hash chain of FIG. 4A, and assume that based on the key provided in Step 600, the date of birth is to be retrieved from the hash chain. Using the key "DoB", block 2 (410C) is identified as the most recent block that includes the date of birth as a subject attribute value. Accordingly, the date of birth is retrieved from block 2.

In Step 606, a determination is made about whether the subject data, i.e., the subject attribute value obtained in Step 604, is incremental. Returning to the previously discussed example, the date of birth is stored as a constant, and is therefore not incremental. However, alternatively, consider that the account balance is to be retrieved from the hash chain. Using the key "Account Balance", block 2 (410C) is again identified as the most recent block that includes an account balance. However, the account balance is stored as an increment or delta. Accordingly, additional steps, as subsequently described, are necessary to restore the absolute account balance.

Continuing with the discussion of Step 606, if a determination is made that the obtained subject data are incremental, the method may proceed to Step 608. Alternatively, if a determination is made that the subject data are not incremental, the method may directly proceed to Step 612.

In Step 608, earlier subject data associated with the key are retrieved from the hash chain. Consider the previously introduced example in which the account balance retrieved from block 2 (410C) was incremental. Inspection of earlier blocks shows that block 1 (410B) also includes a subject attribute value that matches the key "Account Balance", and the subject attribute value is therefore retrieved from block 1 (410B). The subject attribute value is in absolute format, and accordingly combination (addition) of the account balances obtained from blocks 1 and 2 of the hash chain may result in the current account balance. While in the example only one additional step toward earlier blocks had to be performed to obtain the account balance, those skilled in the art will appreciate that in other scenarios additional incremental subject attribute values may exist, which may be retrieved by repeated execution of Step 508.

In Step 610, the retrieved subject data are combined to obtain the subject data to be returned, i.e., the initial absolute subject attribute value and the incremental subject attribute value(s) are added. Similar operations may be performed with non-numerical variables. For example, multiple strings may be concatenated to obtain a string to be returned.

In Step 612, the subject data are returned in response to the subject data read request.

Figure 7:
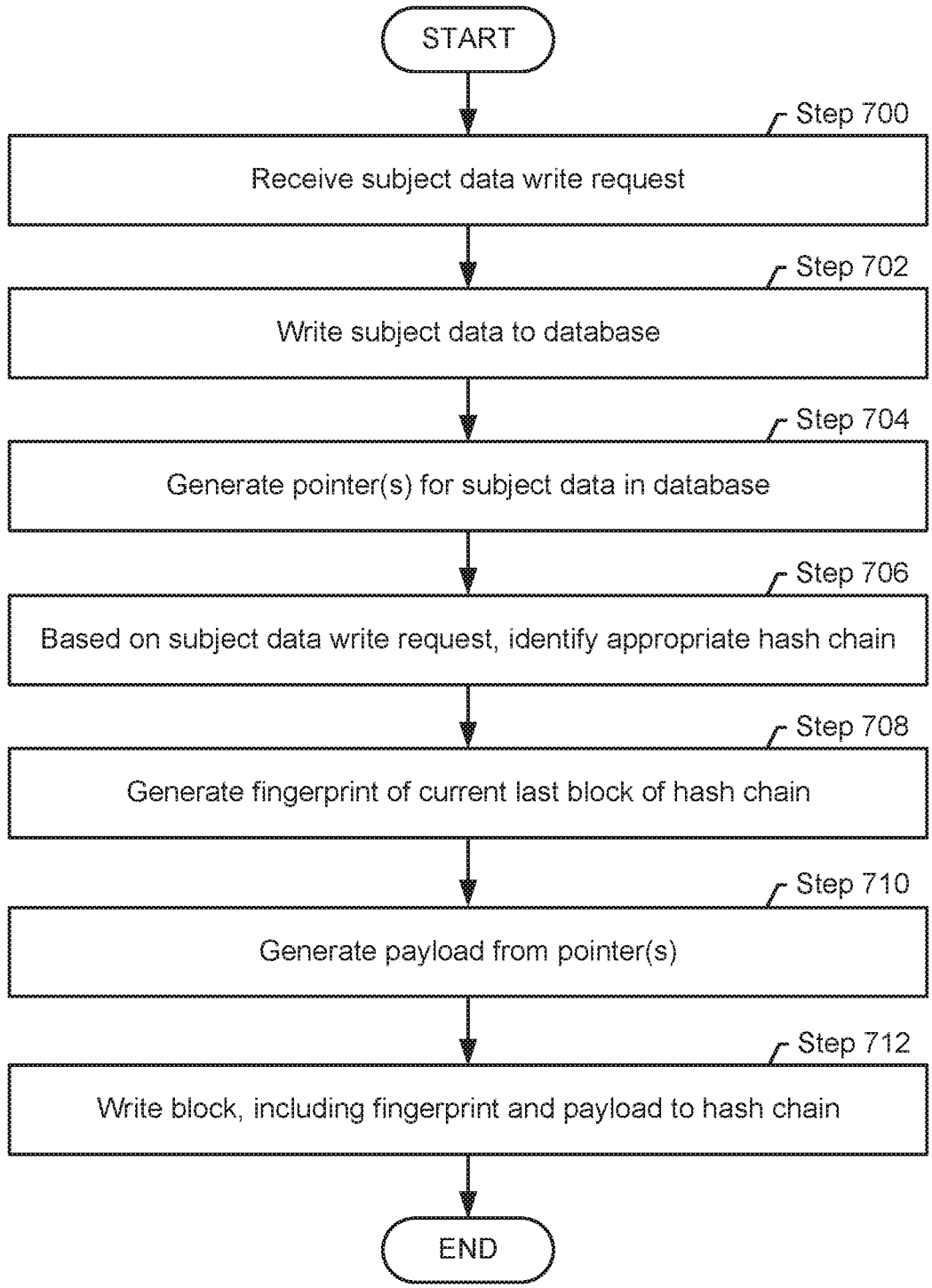

FIG. 7 shows a method for writing subject data to a database and for adding a pointer identifying the subject data in the database to the hash chain, in accordance with one or more embodiments of the disclosure. The subject data may include one or more subject attribute values.

In Step 700, a subject data write request is received. The execution of Step 700 may be analogous to the execution of previously described Step 500.

In Step 702, the subject data are written to a database. The data written to the database may include a subject attribute value, as previously described with reference to FIGS. 2B, 3C and 3D.

In Step 704, a pointer is generated for the subject attribute value written to the database. The generated pointer may be directed to the address where the subject attribute value is stored in the database. The generated pointer may subsequently be used to address the subject attribute value stored in the object database. If multiple subject attribute values are included in the subject data to be written, Steps 702 and 704 may be performed for these subject attribute values.

In Step 706, based on the subject data write request, the appropriate hash chain for referencing the subject data stored in the database is identified. The execution of Step 706 may be analogous to the execution of previously described Step 502, even though in the method described with reference to FIG. 5, the subject data are stored in the hash chain, while in the method of FIG. 7, pointers to the subject data are stored in the hash chain.

In Step 708, a fingerprint of the current last block of the hash chain is generated. The execution of Step 708 may be analogous to the execution of previously described Step 504.

In Step 710, the payload to be included in the block that is being added to the hash chain is generated. The payload, in accordance with one or more embodiments of the disclosure, is generated from the pointer obtained in Step 704 and a key associated with the subject attribute value that the pointer addresses. The payload may further include a subject ID. A subject ID may be included if the hash chain is used for the documentation of multiple subjects, thereby enabling distinction of the objects, based on the subject ID.

In Step 712, a new block is written to the hash chain. The new block is formed by the payload obtained in Step 710 and the fingerprint obtained in Step 708. The newly appended block establishes the new end of the hash chain, where an additional block may be appended at a later time. Due to the embedded fingerprint of the previous block, the order of blocks, added by repeated execution of the method of FIG. 7, is unambiguously established.

Figure 8:
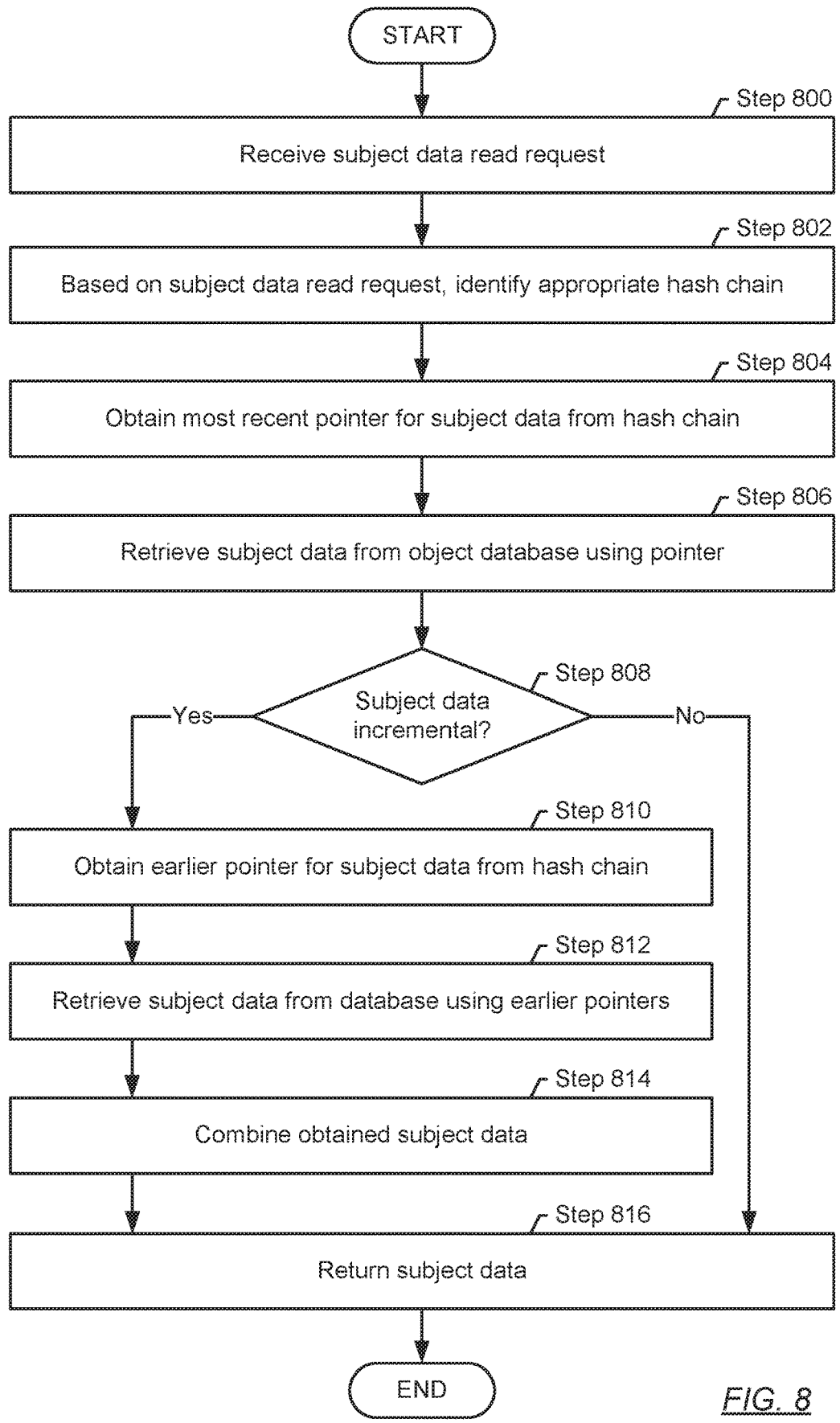

Turning to FIG. 8, a method for retrieving subject data from a database using a pointer stored in a hash chain, in accordance with one or more embodiments of the disclosure, is shown. The method may be used to retrieve subject data that were previously written to the database as described with reference to FIG. 7.

In Step 800, a subject data read request is received. The subject data read request may include a key used to identify the subject attribute value to be read. The subject data read request may further include a subject ID used to identify the subject for which subject data are to be obtained.

In Step 802, based on the subject data read request, the appropriate hash chain in which the pointer is stored is identified. The appropriate hash chain is selected from the set of hash chains stored in the hash chain repository. The appropriate hash chain may be identified based on the subject ID.

In Step 804, the most recent pointer associated with the key provided with the data read request is obtained. The identification of the most recent pointer may further be based on the subject ID, analogous to Step 604.

In Step 806, the subject data, i.e. the subject attribute value stored under the address identified by the pointer, is retrieved from the database.

In Step 808, a determination is made about whether the subject attribute value obtained in Step 806 is incremental. As previously discussed with reference to Step 606, a retrieved subject attribute value is considered incremental if the subject attribute value is a delta or increment applied to an earlier subject attribute value. If a determination is made that the obtained subject attribute value is incremental, the method may proceed to Step 810. Alternatively, if a determination is made that the subject attribute value is not incremental, the method may directly proceed to Step 816.

In Step 810, an earlier pointer associated with the key is retrieved from the hash chain, and in Step 812, the subject data, i.e. the subject attribute value stored under the address identified by the earlier pointer, is retrieved from the database.

In Step 814, the retrieved subject data are combined to obtain the subject data to be returned.

In Step 816, the subject data are returned in response to the subject data read request.

While the methods described with reference to FIGS. 5, 6, 7 and 8 describe the writing/reading of single subject attribute values, those skilled in the art will appreciate that multiple values may be simultaneously processed without departing from the disclosed technology.

Various embodiments of the disclosure have one or more of the following advantages. Embodiments of the disclosed technology enable documentation of subjects. Any types of subjects, including, for example, business activities and human activities may be documented using embodiments of the disclosure. Accordingly, embodiments of the disclosure may be applied in many different contexts involving two or more parties, or more broadly speaking the interaction between businesses, between humans and businesses, and between humans. Embodiments of the disclosure may further be applied in contexts involving a single party only, for example when monitoring a process or system. More specific examples include, but are not limited to, the purchasing of a good or service, the determination of credit worthiness, medical care, accounting and business entity attribute updates, purchasing a service, monitoring compliance with requirements, etc. Decisions, e.g., business decisions, may then be made based on evaluation of the cumulative history obtained using embodiments of the disclosure.

The documentation of a subject that is represented as an object using a hash chain may ensure that each step, changes and progress are fully documented and explainable at any point. A complete history of events is, thus, available. The current state or prior states of the subject, at any point in time, may be retrieved from the hash chain. Embodiments of the disclosure therefore have the potential to eliminate gaps that in traditional approaches may cause misunderstandings, disputes or even fraud. Disputes may be resolved based on the comprehensive documentation provided by the hash chains. Because all updates to the hash chain by addition of new blocks are cryptographically bound to all previous blocks of the hash chain, the entire object history is verifiable at any point in time, the order of events associated with the subject is strictly maintained, and corruption is readily detectable. Further, by maintaining multiple copies of a hash chain, unauthorized modifications to previously written blocks become difficult or near impossible, because any deviation in one copy of the hash chain would be recognizable when comparing the modified copy against other copies of the hash chain. Accordingly, subjects documented in accordance with one or more embodiments of the disclosure are safeguarded against error and fraud, and the system itself may detect anomalies or exceptions. This may be particularly relevant in applications such as accounting, where the traditional ledger-based approaches offer none of these features.

Embodiments of the disclosure may be implemented on a computing system. Any combination of mobile, desktop, server, router, switch, embedded device, or other types of hardware may be used. For example, as shown in FIG. 9A, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system shown in FIG. 9A, or a group of nodes combined may correspond to the computing system shown in FIG. 9A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9A. Further, the client device (926) may include and/or perform all or a portion of one or more embodiments of the disclosure.

The computing system or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve interfaces or communication channel end-points enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 9A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 9A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 9A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 9A and the nodes and/or client device in FIG. 9B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for documenting a subject, the method comprising:

19 receiving a subject data write request comprising subject data specific to the subject to be documented and a subject ID, wherein the subject data comprise at least one subject attribute value;

writing the at least one subject attribute value to an object database;

generating at least one pointer to the at least one subject attribute value in the object database;

generating a fingerprint from a current last block of a hash chain;

generating a payload from (i) the at least one pointer or at least one subject attribute value and (ii) at least one key identifying the at least one subject attribute value, wherein the payload comprises the subject ID;

appending a block to the hash chain, wherein the appended block comprises the payload and the fingerprint;

receiving a read request for subject data, wherein the read request specifies a read request key;

identifying, from the at least one key of the payload, the key that matches the read request key;

identifying the pointer associated with the key that matches the read request key;

obtaining, from the object database, the requested subject data comprising the subject attribute value associated with the identified pointer; and returning the requested subject data.

2. The method of claim 1 further comprising, prior to generating the fingerprint from the current last block of the hash chain:

based on the subject, identifying from a plurality of hash chains, the hash chain.

3. The method of claim 1, wherein the hash chain is specific to the subject.

4. The method of claim 1, wherein the hash chain is configured to store subject data associated with a plurality of subjects.

5. The method of claim 1 further comprising, prior to returning the requested subject data:

making a determination that the subject attribute value associated with the identified pointer is an adjustment, and based on the determination:
obtaining additional subject data from the hash chain; and
combining the additional subject data with the subject data to obtain the subject data to be returned.

6. The method of claim 1, wherein a cumulative history of the subject is provided by an entirety of subject attribute values stored in a plurality of blocks of the hash chain.

7. A method for documenting financial transactions using hash chains, the method comprising:

receiving a financial transaction data write request comprising at least one subject attribute value;

generating a fingerprint from a current last block of a hash chain;

generating a payload from the financial transaction data, the payload comprising the at least one subject attribute value and at least one key identifying the at least one subject attribute value;

appending a block to the hash chain, wherein the appended block comprises the payload and the fingerprint;

receiving a read request for financial transaction data, wherein the read request specifies a read request key;

identifying, from the at least one key of the payload, the key that matches the read request key;

20 obtaining the requested financial transaction data from the appended block of the hash chain by retrieving, from the at least one subject attribute value, the subject attribute value associated with the key that matches the read request key; and returning the requested financial transaction data.

8. The method of claim 7, wherein the at least one subject attribute value comprises at least one selected from a group consisting of a constant, a variable, and an adjustment modifying a previously stored subject attribute value.

9. The method of claim 7 further comprising, prior to returning the requested financial transaction data:

making a determination that the subject attribute value associated with the read request key is an adjustment, and based on the determination:
obtaining additional financial transaction data from the hash chain; and
combining the additional financial transaction data with the financial transaction data to obtain the financial transaction data to be returned.

10. A system for documenting a subject using hash chains, the system comprising:

a hardware processor;

a communication interface executing on the hardware processor configured to receive a subject data write request comprising subject data specific to the subject to be documented and a subject ID;

an object database configured to receive an entry comprising at least one subject attribute value;

a hash chain processing engine configured to:
generate at least one pointer to the at least one subject attribute value in the object database;
generate a fingerprint from a current last block of a hash chain;
generate a payload from (i) the at least one pointer or at least one subject attribute value and (ii) at least one key identifying the at least one subject attribute value, wherein the payload comprises the subject ID; and
append a block to the hash chain stored in a hash chain repository, wherein the appended block comprises the payload and the fingerprint, wherein the communication interface is further configured to receive a request for subject data, wherein the read request specifies a read request key; and wherein the hash chain processing engine is further configured to:
identify, from the at least one key of the payload, the key that matches the read request key;
identify, from the at least one pointer in the appended block of the hash chain, the pointer associated with the key that matches the read request key;
obtain, from the object database, the requested subject data comprising the subject attribute value associated with the identified pointer; and
return the requested subject data, via the communication interface.

11. The system of claim 10, wherein the hash chain processing engine is further configured to make a determination that the subject attribute value associated with the identified pointer is an adjustment, and based on the determination:
obtain additional subject data from the hash chain; and
combine the additional subject data with the subject data to obtain the object data to be returned.

12. A non-transitory computer readable medium comprising computer readable program code for causing a computer system to:
- receive a subject data write request comprising subject data specific to the subject to be documented, wherein the subject data comprise at least one subject attribute value;
- write the at least one subject attribute value to an object database;
- generate at least one pointer to the at least one subject attribute value in the object database;
- generate a fingerprint from a current last block of a hash chain;
- generate a payload from the at least one pointer and at least one key identifying the at least one subject attribute value;
- append a block to the hash chain, wherein the appended block comprises the payload and the fingerprint;
- receive a read request for subject data, wherein the read request specifies a read request key;
- identify, from the at least one key of the payload, the key that matches the read request key;
- identify the pointer associated with the key that matches the read request key;
- obtain, from the object database, the requested subject data comprising the subject attribute value associated with the identified pointer; and
- return the requested subject data.

13. The non-transitory computer readable medium of claim 12, wherein the computer readable program code further causes the computer system to, prior to generating the fingerprint from the current last block of the hash chain:
- based on the subject, identify the hash chain from a plurality of hash chains.

14. The non-transitory computer readable medium of claim 12, wherein the hash chain is configured to store subject data associated with a plurality of subjects.

15. The non-transitory computer readable medium of claim 12, wherein the at least one subject attribute value comprises at least one selected from a group consisting of a constant, a variable, and an adjustment modifying a previously stored subject attribute value.

16. The non-transitory computer readable medium of claim 12, wherein the computer readable program code further causes the computer system to, prior to returning the requested subject data:
- make a determination that the subject attribute value associated with the identified pointer is an adjustment, and based on the determination:
- obtain additional subject data from the hash chain; and
- combine the additional subject data with the subject data to obtain the subject data to be returned.

* * * * *

UNITED STATES PATENT AND TRADEMARK OFFICE
CERTIFICATE OF CORRECTION

PATENT NO. : 11,003,653 B2  
APPLICATION NO. : 15/994866  
DATED : May 11, 2021  
INVENTOR(S) : Glenn Carter Scott et al.

It is certified that error appears in the above-identified patent and that said Letters Patent is hereby corrected as shown below:

In the Claims

At Column 20, Claim number 11, Line number 67, "data to obtain the object data to be returned" should read -- data to obtain the subject data to be returned --.

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*